United States Patent [19]

Barkan

[11] Patent Number: 5,157,248
[45] Date of Patent: Oct. 20, 1992

[54] LASER DIODE SCANNER WITH MINIMIZED POWER CONSUMPTION, MINIMIZED DEAD ZONE, AND INCREASED SAFETY

[75] Inventor: Edward Barkan, South Setauket, N.Y.

[73] Assignee: Symbol Technologies, Inc., Bohemia, N.Y.

[21] Appl. No.: 683,507

[22] Filed: Apr. 8, 1991

Related U.S. Application Data

[63] Continuation of Ser. No. 265,143, Oct. 31, 1988, abandoned.

[51] Int. Cl.[5] .......................... G06K 7/01; G06K 7/10
[52] U.S. Cl. .................................... 235/472; 235/455
[58] Field of Search ............... 235/462, 472, 467, 470, 235/466, 455, 454; 350/6.1, 6.5, 6.6; 250/566, 235; 359/199, 212, 213, 214

[56] References Cited

U.S. PATENT DOCUMENTS

| | | | |
|---|---|---|---|
| 4,240,064 | 12/1980 | DevChoudhury | 235/455 |
| 4,460,120 | 7/1984 | Shepard et al. | 235/462 |
| 4,496,831 | 1/1985 | Swartz et al. | 235/472 |
| 4,536,648 | 8/1985 | Kruze et al. | 235/454 |
| 4,567,360 | 1/1986 | Yamada | 235/455 |
| 4,639,606 | 1/1987 | Boles et al. | 235/455 |
| 4,820,911 | 4/1989 | Arackellian et al. | 235/467 |

Primary Examiner—Robert Weinhardt
Attorney, Agent, or Firm—Arnold, White & Durkee

[57] ABSTRACT

A laser diode in a scanner is deactuated during part of each scan to conserve power and to increase the working lifetime of the diode and of a battery for powering the scanner. The dead zone in which specular reflection may prevent a successful reading of the symbol is minimized. The scanner includes a head which cannot be disassembled unless an electrical cable connecting the head to the remainder of the scanner is first removed.

18 Claims, 6 Drawing Sheets

LASER DIODE SCANNER WITH MINIMIZED POWER CONSUMPTION, MINIMIZED DEAD ZONE, AND INCREASED SAFETY

BACKGROUND OF THE INVENTION

1. Field of the Invention

This invention generally relates to laser scanning systems for reading indicia having portions of different light reflectivity such as bar code symbols and, more particularly, to a lightweight, multi-component, portable laser diode scanning head supportable by a user and aimable at each symbol to be read. Still more particularly, this invention relates to deactuating at least one of the components, e.g. the laser diode, during part of each scan of the symbol; minimizing the dead zone within the field of view of a detector in the head, in which dead zone specular reflection may prevent a successful decode and reading of the symbol; and resisting separation of parts of the head unless an electrical cable connecting the head to the remainder of the system is first removed.

2. Description of Related Art

Various optical readers and optical scanning systems have been developed heretofore to optically read bar code symbols printed on labels affixed to objects in order to identify the object by optically reading the symbol thereon. The bar code symbol itself is a coded pattern comprised of a series of bars of various widths, and spaced apart from one another to bound spaces of various widths, said bars and spaces having different light-reflecting characteristics. Such readers and systems electro-optically decoded the coded patterns to a multiple alpha-numerical digit representation descriptive of the object. Scanning systems of this general type, and components for use in such systems, have been disclosed, for example, in U.S. Pat. Nos. 4,251,798; 4,360,798; 4,369,361; 4,387,297; 4,593,186; 4,496,831; 4,409,470; 4,460,120; 4,607,156; 4,673,805; 4,736,095; 4,758,717 and 4,760,248, as well as in U.S. Ser. Nos. 196,021; 7,775; 944,848; 138,563; 148,438; 148,669; 148,555 now U.S. Pat. Nos. 4816660, 4808804, 4816661, 4871904, 4806742, 4825057 and 4845350 respectively; and 193,265 now U.S. Pat. No. 5124540; all of which have been assigned to the same assignee as the instant application and are incorporated herein to show the state of the art.

As disclosed in some of the above patents and applications, a particularly advantageous embodiment of such a scanning system resided, inter alia, in optically modifying and directing a laser light beam from a hand-held head which was supported by a user; aiming the head and, in some cases, the laser beam itself at a symbol to be read; repetitively scanning the laser beam and/or the field of view of a detector across the symbol; detecting the laser light reflected off the symbol during scanning; and decoding the detected reflected light.

The laser beam is optically modified and focused to form a beam spot having a minimum beam cross-section or waist at a reference plane. A symbol can be read at either side of the reference plane. For ease of description, a symbol located between the reference plane and the head is defined as a "close-in" symbol, whereas a symbol that is located on the other side of the reference plane away from the head is defined as a "far-out" symbol. The term "close-in" symbol is also intended to cover the situation where the symbol actually is contacted by the head, or where the reference plane is located immediately outside the head. The range between minimum and maximum distances at which the system can read a symbol is often defined as the "depth of field". The depth of field is, of course, different for symbols of different densities.

A problem associated with known laser scanning systems involves the so-called dead zone or area within the field of view of the scanner in which specular reflection may prevent a successful decoding and reading of the symbol. When a light beam impinges on a surface, such as a symbol on a label, the reflected light has a specular component and a scattered component. The scattered component radiates in all directions, and its intensity is proportional to the contrast between the darker bars and the lighter spaces of the symbol. It is the scattered component of the reflected light which is detected and processed by the system to decode and read the symbol.

The specular component, on the other hand, is a mirror-like reflection wherein the light is reflected according to the principle that the angle of reflection is equal to the angle of incidence. The specular component is the major constituent of the reflected light, but is not that constituent which is used by the system to decode and read the symbol, because the intensity of the specular component is more dependent on surface finish as opposed to the contrast between the darker bars and the lighter spaces of the symbol. The specular component, also called glare, is typically too bright, particularly when a symbol is printed on a label having a glossy finish or overlaid with cellophane or film packaging, and can overload and "blind" the detector.

When the system includes a hand-held head having a handle which is held by a user, and is pointed at a symbol, the untrained user expects the head to work best when the laser beam exiting an exit window on the head is aimed at a right angle to the plane in which the symbol lies. The user tends to hold the handle approximately parallel to that plane. However, this is the very position where the dead zone is centered and has its maximum effect, because specular light striking the symbol at an incidence angle of 90° will return at a reflection angle of 90°, thereby blinding the detector.

It would be desirable to minimize the dead zone and enable even the untrained operator to manipulate the hand-held head in an expected manner without causing the system to fail to read due to specular reflection.

Yet another problem associated with known laser scanning systems, particularly the field-portable type powered by an on-board battery, resides in minimizing power consumption and premature draining of the battery. In systems of the type exemplified by U.S. Pat. No. 4,251,798, the gas laser was left on all the time, not only during scanning, but also between scans. In later systems of the type exemplified by U.S. Pat. Nos. 4,387,297 and 4,409,470, the laser was shut off between scans to save power.

Although the later systems did consume less power, the power drain was still undesirably high, particularly when visible laser diodes are used. The diode is the largest consumer of electrical current of all the components in the head. Operating the diode, except when absolutely necessary to scan the symbol, decreases not only the battery life, but also decreases the working lifetime of the diode itself.

The diode is also the greatest source of waste heat in the head, and the working lifetime of the diode also is decreased by being exposed to its own heat. By operating the diode only when necessary, the diode will generate less heat, thereby enabling the head to run cooler than heretofore, enabling the head to be used in hotter ambient environments than heretofore, and enabling the diode to last longer in the field.

Yet an additional drawback involves safety, wherein it is desired to prevent one from separating different housing parts of the head without first being certain that all power to the head is first disconnected.

SUMMARY OF THE INVENTION

1. Objects of the Invention

It is a general object of this invention to overcome the aforementioned problems and drawbacks of known prior art laser scanning systems.

Another object of this invention is to deactuate at least one component, particularly the laser diode, during part of each scan.

Yet another object of this invention is to minimize power consumption inside the head.

Still another object of this invention is to minimize the build-up of heat inside the head.

A further object of this invention is to increase the working lifetime of a battery used for powering the components in the head.

Yet a further object of this invention is to increase the working lifetime of the laser diode.

A still further object of this invention is to enable the head to be used in warmer ambient environments than previously.

Another object of this invention is to minimize the size and effects of the dead zone.

Yet another object of this invention is to enable a user to use the head in an expected manner and orientation without causing specular reflection to prevent a successful decode and reading of the symbol.

A further object of this invention is to resist separation of parts of the head unless an electrical cable connecting the head to the remainder of the system is first removed.

Still another object of this invention is to provide a hand-held laser diode scanning head which is lightweight, compact, rugged, non-wrist-and-arm fatiguing, and capable of emitting a laser beam visible to the human eye, whereby the visible laser beam can be readily positioned on and across close-in and far-out symbols.

Another object of this invention is to provide a laser diode scanning head capable of reading not only symbols in contact with the head, but also close-in and far-out symbols.

2. Features of the Invention

In keeping with these objects, and others which will become apparent hereinafter, one feature of this invention resides, briefly stated, in a laser scanning system for reading indicia having portions of different light reflectivity, e.g. a bar code symbol having alternating darker bars separated by lighter spaces of variable widths. The system includes a housing, and a light source means therein for generating an incident laser beam. Advantageously, the light source means comprises a semiconductor laser diode which emits laser light at a wavelength of about 670 to about 680 nm so that the emitted laser light is at least marginally visible to the human eye.

Optic means are also provided in the housing, and are operative for optically forming and directing the incident laser beam along an optical path toward the symbol located within a range of working distances relative to the housing. Laser light is reflected off the symbol. At least a returning portion of the reflected light travels away from the symbol back toward the housing.

Scanning means, e.g. a scanning motor, having a reciprocally-oscillatable output shaft on which a reflecting surface such as a scanning mirror is mounted, are mounted in the head for scanning the symbol in a scan, and preferably at a plurality of sweeps per second across the symbol in a repetitive manner. The returning portion of the reflected laser light has a variable light intensity across the symbol during the scan which is due, in the case of a bar code symbol, to the different light-reflective characteristics of the bars and spaces which constitute the symbol.

The system also comprises sensor means, e.g. one or more photodiodes, for detecting the variable light intensity of the returning portion of the reflected laser light over a field of view, and for generating an electrical signal, typically an analog signal, indicative of the detected variable light intensity.

Signal processing means are provided for processing the analog electrical signal, and usually for processing the same to a digitized electrical signal which can be decoded to data descriptive of the symbol being scanned.

The scanning means is operative for scanning either the incident laser beam itself across the symbol, or the field of view of the sensor means, or both.

Decode/control electronic circuitry is sometimes, but not always, provided on-board the housing, but may also be located remotely therefrom. Such circuitry is operative for decoding the digitized signal to the aforementioned data, for determining a successful decoding of the symbol, and for terminating the reading of the symbol upon the determination of the successful decoding thereof. The reading is initiated by actuation of an actuator, typically a manually-actuatable trigger means provided on the housing, and operatively connected to, and operative for actuating, the light source means, the scanning means, the sensor means, the signal processing means, and the decode/control means. The trigger means is actuated once for each symbol, each symbol in its respective turn.

In a hand-held application, the housing, also called a laser scanning head, is supported by a user in his or her hand, is aimed at each symbol to be read and, once the symbol is located, the user actuates the trigger means to initiate the reading. The decode/control means automatically alerts the user when the symbol has been read so that the user can turn his or her attention to the next symbol, and repeat the reading procedure.

One feature of this invention resides in minimizing power consumption in the head, particularly by the laser diode which, as noted above, represents the largest consumer of electrical current and the largest generator of waste heat in the head. By way of comparison, the laser diode, in one preferred embodiment, uses about 90 ma, while the rest of the components in the scanner use about 25 ma, when all the components in the head are actuated. This invention proposes means for deactuating at least one of the light source means, scanning means, sensor means and the signal processing means during each scan when either said incident laser beam and/or said field of view is outside the scan field within which the symbol is located. By contrast with prior art designs, where the laser source was either kept on all the time or shut off between scans, this aspect of the invention turns the laser off at least once during each scan, and specifically in the overscan portions of the scan field. By way of example, if it is assumed that the symbol has a length of about 2¼", then the scan line which sweeps the symbol measures generally on the order of 3", thereby leaving ⅜ overscan regions at either end of the symbol. Since the symbol is not being read while the laser beam is traversing each of said overscan regions, there is no need to keep the laser diode on while the laser beam is traversing these overscan regions.

It will further be appreciated that the linear spot speed during each scan is not a linear function. In each overscan end region, the beam spot speed is slower, as compared to the beam spot speed across the symbol. It has been estimated that the laser beam spends about 20% of its time during each scan in each overscan end region. Therefore, in terms of time and duty cycle, the laser beam is only spending 60% of its time in useful activity scanning the symbol.

The deactuating means advantageously interrupts the supply of current to the laser diode and shuts it off each time the laser beam enters an overscan region. The deactuating means includes means for sensing opposite end limits of the scan field, and means for generating a deactivation electrical signal for each such sensed end limit.

By turning the laser diode on only when it is absolutely necessary, i.e. when the laser beam is traversing the symbol, electrical energy consumption in the head is significantly minimized. When a rechargeable battery is used to power the components in the head, the working lifetime of the battery is correspondingly increased. By maintaining the diode off during part of each scan, less heat is generated within the head. Since the total number of hours of useful life of the laser diode is at least partly temperature-dependent, the reduction of heat in the head further increases the working lifetime of the diode.

Still another feature of this invention is embodied in reducing the size of the so-called dead zone within the field of view of the scanner in which specular reflection may prevent a successful decoding and reading of the symbol. As previously explained, the untrained user tends to orient the hand-held head in the very position where the dead zone is centered and has its maximum deleterious effect. This invention proposes directing the incident laser beam to travel at an acute angle relative to a generally planar upper wall of the head as the incident laser beam passes through an exit port on the head en route to the symbol. Hence, even if the untrained user points the head so that its barrel is pointed at a right angle to the symbol being read, the effects of specular reflection are minimized because the incident laser beam itself has been deliberately offset relative to the elongation of the barrel. In one preferred embodiment, the outgoing laser beam travels at an acute angle of approximately 3° relative to the horizontal.

Still another way of minimizing the specular component includes means for mounting a scanning mirror at a rear end region of the elongated barrel of the head. The further back the scanning mirror is relative to the symbol, the less chance exists of collecting reflected specular light. Furthermore, it is advantageous if the scanning mirror is configured to have a height dimension, as considered along a direction generally normal to the scan direction, to be about one-half its width dimension, as considered along the scan direction. By making the vertical height of the scanning mirror as small as possible, again the chances of collecting specular light are reduced.

Still another method of minimizing the dead zone, of particular benefit when the head is used to read symbols in contact therewith, is to slope a front end region or nose of the housing at an acute angle relative to the generally planar upper wall of the housing. Since the nose is sloped rearwardly toward a bottom planar wall of the head, this will further reinforce the movement of the beam away from the vertical, as the operator will tend to hold the nose parallel to the plane in which the symbol lies, especially when the scanner is used in contact with the symbol.

An additional feature of this invention resides in a safety interlock for resisting separation of two parts of the head unless an electrical cable, which is connected to the head, is first removed therefrom. The cable typically carries power to the head and, as a safety precaution, it is best that the head not be capable of being disassembled when power is being supplied thereto. The interlock includes a pair of aligned channels, one on each housing part. The cable is provided with an elongated pin connector which extends through the aligned channels during system operation, and which affirmatively prevents the housing parts from being separated unless the pin is removed from the aligned channels. Previously, such safety precautions were attempted to be realized by an electrical switch provided on the housing. However, a negligent or ignorant user may not have actuated the safety switch, thereby compromising user safety.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Referring now to FIGS. 1–4 of the drawings, reference numeral 10 generally identifies a lightweight (less than one pound), streamlined, hand-held, fully-portable, easy-to-manipulate, non-arm-and-wrist fatiguing laser scanning head supportable entirely by a user for use in a laser scanning system operative for reading, scanning and/or analyzing symbols, and aimable both prior to, and during, the reading thereof, by the user at the symbols, each symbol in its turn. The term "symbol", as used herein, is intended to cover indicia composed of different portions having different light-reflective properties at the wavelength of the light source, e.g. a laser, being utilized. The indicia may be the omnipresent Universal Product Code (UPC) symbol, or any of the black and white industrial symbols, e.g. Code 39, Codabar, Interleaved 2 of 5, etc.. The indicia may also be any alphabetic and/or numeric characters. The term "symbol" is also intended to cover indicia located in a background field, wherein the indicia, or at least a portion thereof, have a different light-reflectivity property than that for the background field. In this latter definition, the "reading" of the symbol is of particular benefit in the fields of robotics and object recognition.

Figure 1:
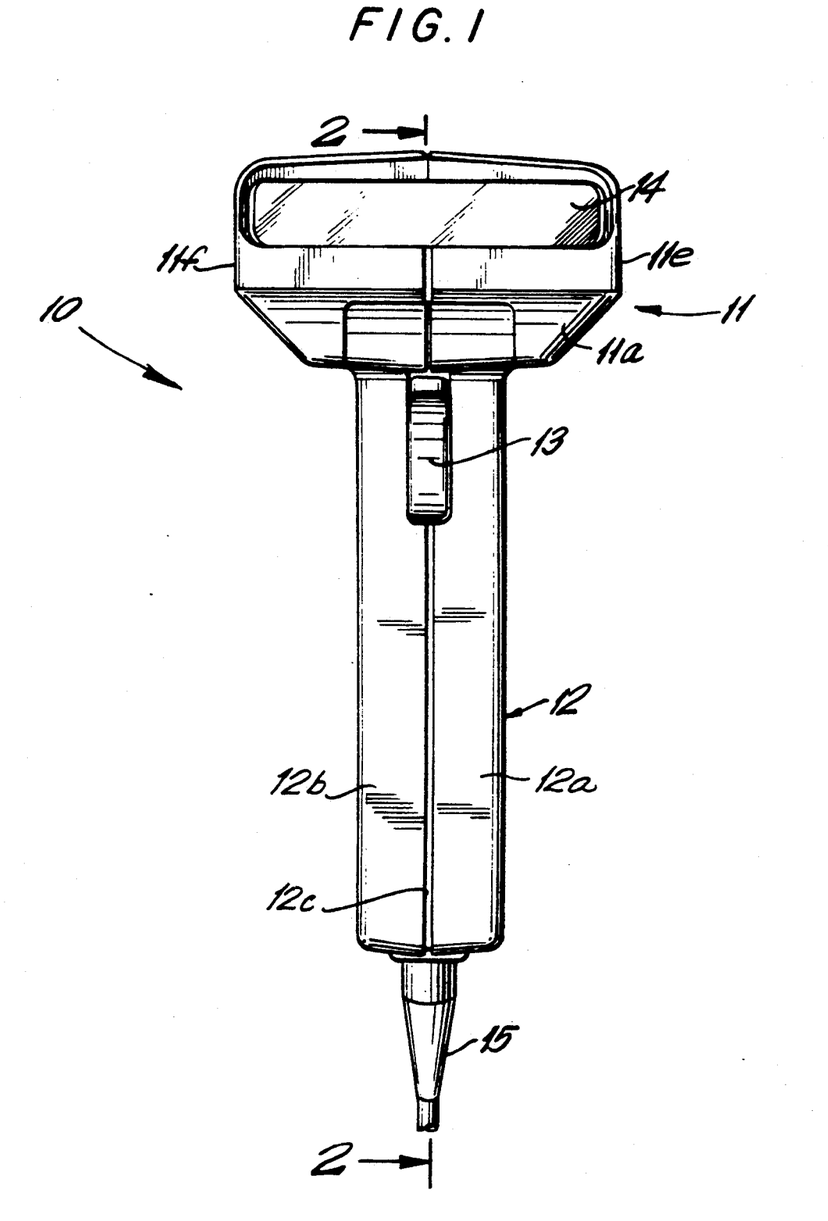
FIG. 1 is a front view of a laser scanning head according to this invention.

Turning now to FIG. 1, the head 10 includes a generally gun-shaped housing having a handle portion 12 of generally rectangular cross-section and generally elongated along a handle axis, and a generally horizontally-elongated barrel or body portion 11. The cross-sectional dimension and overall size of the handle portion 12 is such that the head 10 conveniently can fit and be held in a user's hand. The body and handle portions are constituted of a lightweight, resilient, shock-resistant, self-supporting material, such as a synthetic plastic material. The plastic housing preferably is injection-molded, but can be vacuum-formed or blow-molded to form a thin, hollow shell which bounds an interior space whose volume measures less than a value on the order of 50 cubic inches and, in some applications, the volume is on the order of 25 cubic inches or less. Such specific values are not intended to be self-limiting, but to provide a general approximation of the overall maximum size and volume of the head 10. The shell is formed of two housing parts 12a, 12b meeting along a generally vertical joining line 12c.

Figure 4:
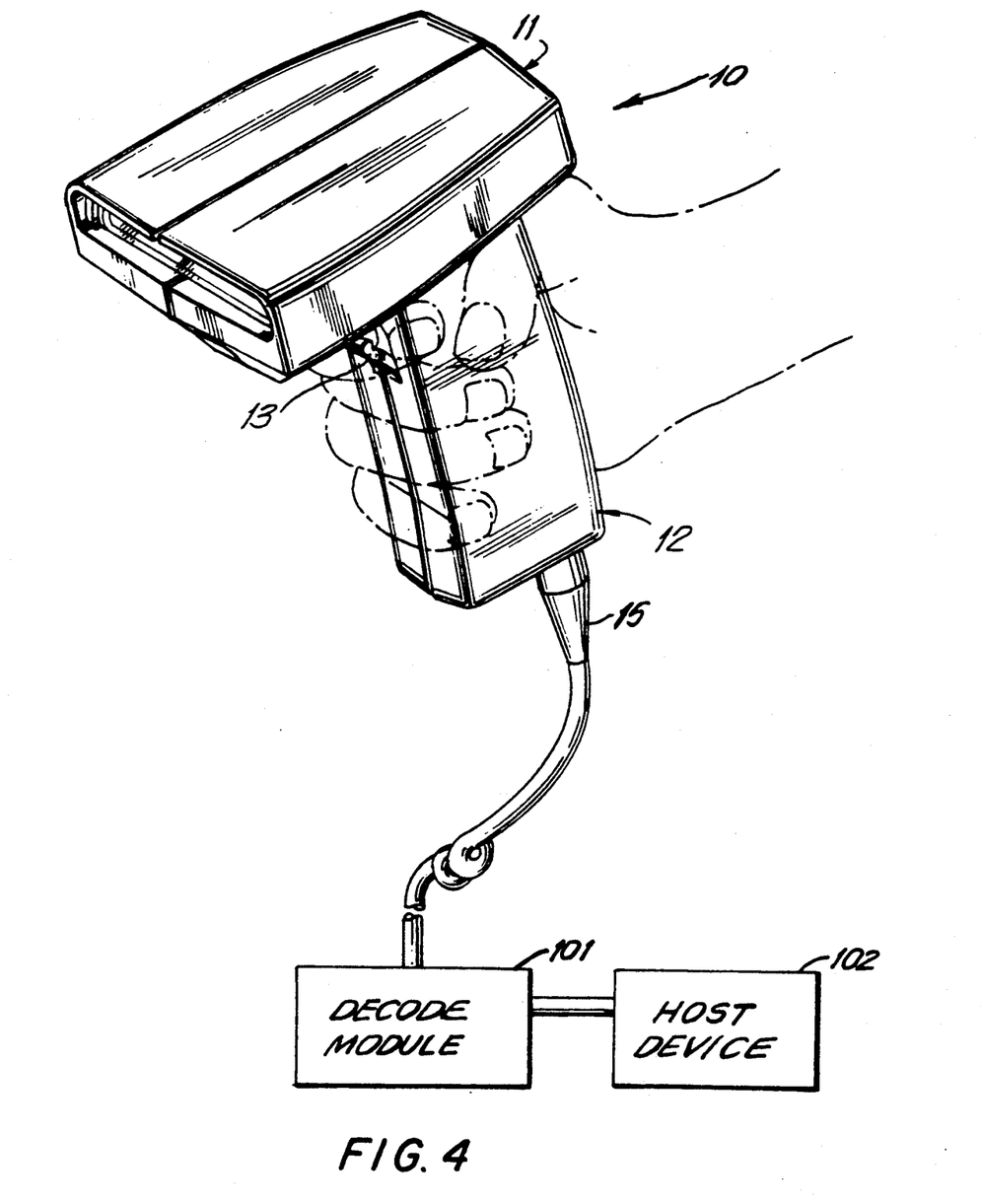
FIG. 4 is a front perspective view of the head of FIG. 1 in use, and schematically connected to other components of a laser scanning system.

As considered in an intended position of use as shown in FIG. 4, the body portion 11 has a front prow region or nose having an inclined front wall 11a. The body portion 11 also has a rear region or stern having a rear wall 11b spaced rearwardly of the inclined front wall 11a. The body portion 11 also has a top wall 11c, a bottom wall 11d below the top wall 11c, and a pair of opposed side walls 11e, 11f between the top and bottom walls. The front wall 11a is sloped relative to the top and bottom walls.

A manually-actuatable, and preferably depressible, trigger 13 is mounted on a cantilever resilient arm 13a for movement relative to the head in a forwardly-facing region where the handle and body portions meet and where the user's forefinger normally lies when the user grips the handle portion in the intended position of use. The bottom wall 11d has a lower opening, and the handle 12 has a forwardly-facing slot through which the trigger 13 projects and is moved. The arm 13a has one end overlying a trigger switch 25 which is switched from an open to a closed state upon depression of the trigger 13.

A window 14 is stationarily mounted at the nose and is light-transmissive to allow laser light to pass from the interior to the exterior of the head, and vice versa.

A flexible, non-bulky, coil-type electrical cable 15 with multiple freedoms of movement interconnects the head 10 to the remainder of the components of the laser scanning system, whose operation is explained in greater detail below.

A plurality of components are mounted in the head and, as explained below, at least some of them are actuated by the trigger 13, either directly or indirectly, by means of a control microprocessor. One of the head components is an actuatable laser light source (see FIGS. 3 and 4), e.g. a semiconductor laser diode 33, operative, when actuated by the trigger 13, for propagating and generating an incident laser beam whose light is at least marginally visible to the human eye. The wavelength of the emitted beam is in the range from about 670 nm to about 680 nm. The emitted laser diode beam is highly divergent; diverges differently in different planes parallel and perpendicular to the longitudinal direction of beam propagation; is non-radially symmetrical, i.e. anamorphic; and has a beam cross-section resembling an oval. The diode may be of the continuous wave or pulse type. The diode requires a low voltage (e.g. 12 v DC or less) supplied by a power regulator and a battery (DC) source which may be provided within the head, or by a re-chargeable battery, pack accessory detachably mounted on the head, or by a power conductor in the cable 15 connected to the head from an external power supply (e.g. DC source).

Figure 8:
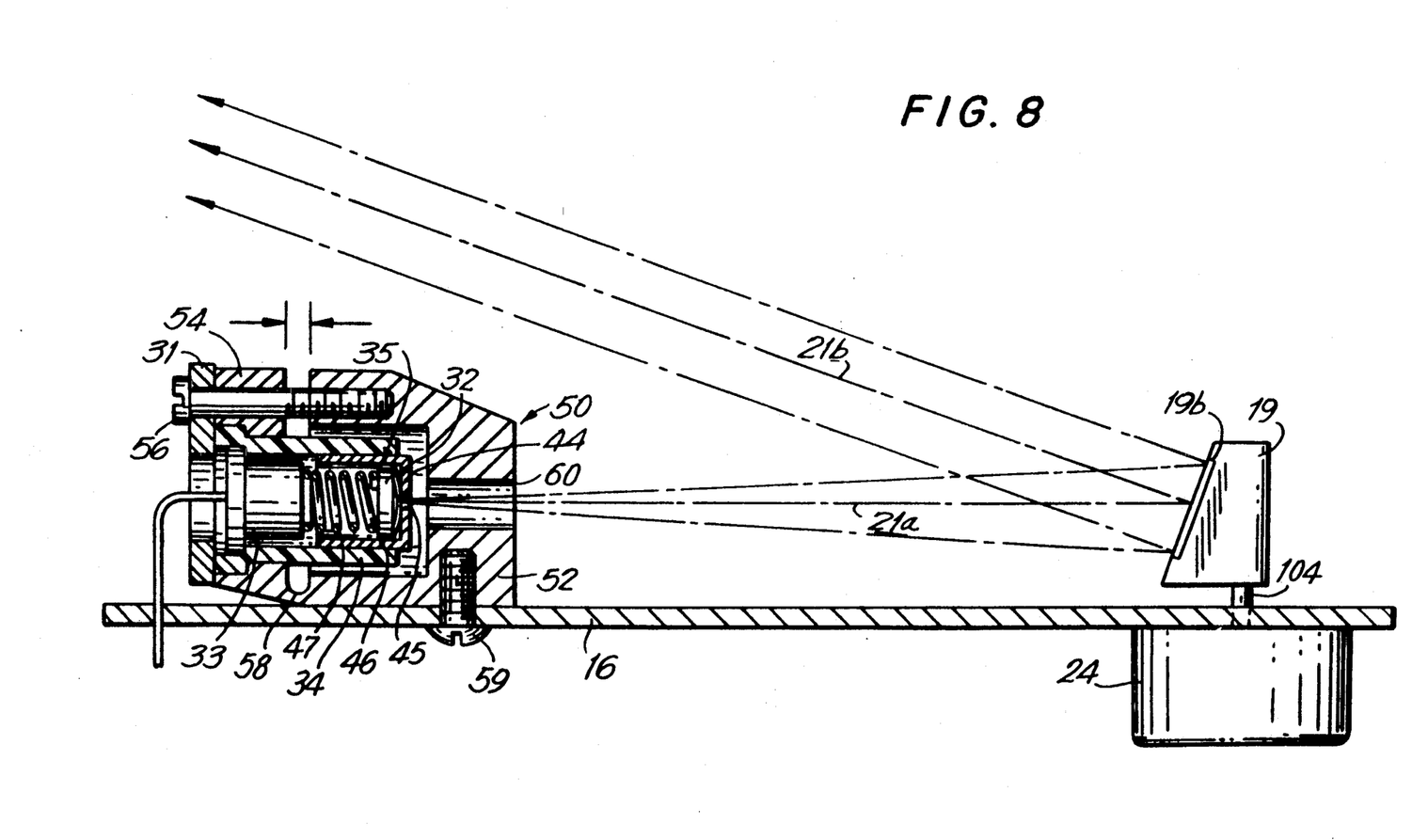
FIG. 8 is an enlarged sectional view of the optical assembly of FIG. 3.

As best shown in FIG. 8, an optical assembly 30 is mounted in the head on a thin, flexible, printed circuit board 16 and adjustably positioned relative to the same for optically modifying and directing the emitted laser beam along a first optical path 21a, 21c toward a reference plane which is located exteriorly of the head, either at the nose for reading symbols in contact with the front wall 11a, or forwardly of the nose for reading symbols out of contact with the front wall 11a. The reference plane lies generally perpendicular to the longitudinal direction along which the emitted laser beam propagates. A symbol to be read is located in the vicinity of the reference plane, either at, or at one side, or at an opposite side, of the reference plane; that is, anywhere within the depth of field of the optically modified laser beam and within a range of working distances as measured relative to the head. The laser beam reflects off the symbol as a specular component in one direction and as a scattered component in many directions, and that portion of the scattered laser light which travels along a second optical path 21c and 21b away from the symbol back toward the head is known herein as the returning portion which, of course, also is at least marginally visible to the user.

As best shown in FIG. 8, the optical assembly includes an elongated, cylindrical optical tube 34 having at one end region a cylindrical bore in which an annular casing portion of the diode 33 is snugly received to hold the diode in a fixed position, and at the opposite end region of the optical tube 34 a lens barrel 35 is mounted for longitudinal movement. The lens barrel 35 includes an aperture stop 45, blocking wall portions 44 surrounding and bounding the aperture stop, and cylindrical side wall portions 46 which bound an interior space.

The optical assembly further includes a focusing lens 32, e.g. a plano-convex lens, located within the interior space of the side wall portions 46 in the first optical path, and operative (with the stop) for focusing the emitted laser beam at the reference plane. The aperture stop 45 may be located on either side of the lens 32, but preferably on the downstream side. A biasing means or tensioned coil spring 47 is located within the optical tube, and has one coil end bearing against a casing portion of the diode, and another coil end bearing against a planar side of the lens 32. The spring constantly urges the lens against the blocking wall portions, thereby fixedly locating the lens relative to the aperture stop. The lens and aperture stop are jointly moved when the lens barrel is longitudinally moved. The side wall portions are initially received in a threaded or sliding relationship with an inner circumferential wall bounding the optical tube and are thereupon fixed, e.g. by glueing or clamping, to the inner circumferential wall when a desired longitudinal spacing between the lens and the aperture stop on the one hand, and the diode on the other hand, has been obtained. The longitudinal movement between the side wall portions and the inner circumferential wall of the tube constitutes an adjustable positioning means for the lens and the aperture stop, and the fixing in position of the lens and the aperture stop relative to the diode constitutes a means for fixedly locating the lens and the aperture stop at a predetermined spacing from the diode.

The aperture stop has a cross-section which is, as explained below, about equal to the cross-section of the emitted laser beam at the aperture stop, thereby permitting a major portion of the emitted laser beam to pass through the aperture stop downstream along the first optical path en route to the symbol. The aperture stop cross-section preferably is rectangular or oval, in which case, the longer dimension of the rectangular or oval cross-section is aligned with the larger divergence angle of the laser beam to transmit more energy to the symbol.

The optical assembly includes an optical block 50 having a front portion 52 and a rear portion 54 together bounding an interior in which the diode 33, optical tube 34, lens barrel 35 and the aforementioned components contained therein are received. A heat sink 31 is mounted in intimate thermal contact with the diode to conduct heat away from the same. An elevation adjustment means, including at least one threaded element 56, passes with clearance through aligned holes formed respectively in the heat sink and the rear portion 54, and is threaded into a threaded bore formed in the front portion 52. A hinge 58 is advantageously realized by providing a thin, flexible, weakened zone in the optical block between the front and rear portions thereof. The front portion 52 is stationarily mounted on the board 16 by anchors 59. The diode, tube, barrel and the components contained therein are mounted on the rear portion for movement therewith. Upon turning the element 56 in either circumferential direction about an axis along which the element 56 extends, the rear portion and all the components supported thereon will be angularly moved about the hinge 58 relative to the stationary front portion, thereby raising or lowering the emitted light beam which exits the block 50 through a clearance passage 60 which is dimensioned so as not to block the beam throughout its angular range of adjustment.

Figure 5:
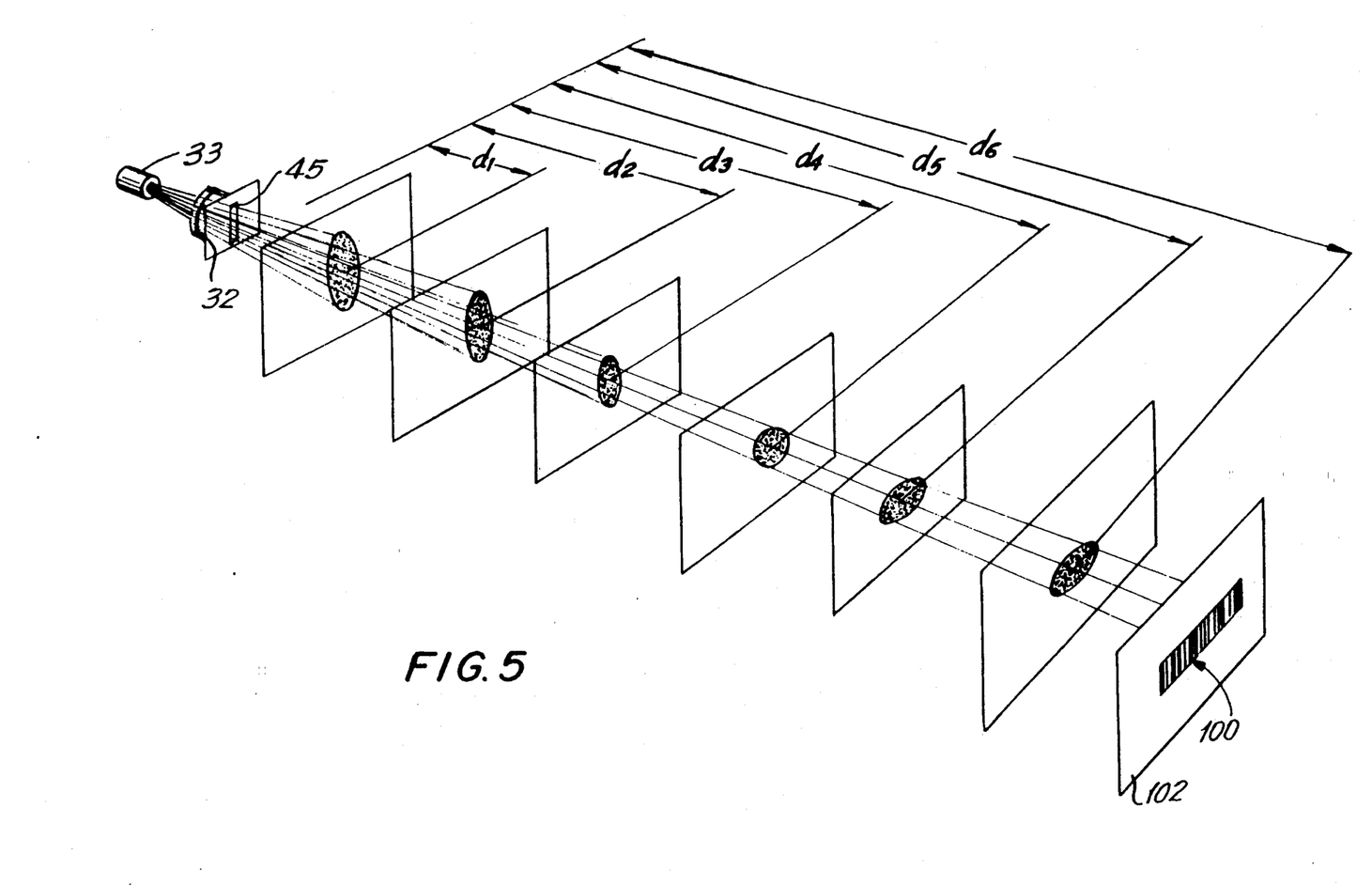
FIG. 5 is a perspective view depicting various cross-sections of the laser beam emitted by the head of FIG. 1.

The laser beam that passes through the passage 60 is directed rearwardly by the optical assembly along path 21a within the head to a generally planar scanning mirror 19b for reflection therefrom. The scanning mirror 19b forwardly reflects the laser beam impinging thereon along path 21c through the forwardly-facing, laser-light-transmissive window 14 and to the symbol. As best shown in FIG. 5, a representative symbol 100 in the vicinity of the reference plane 102 is shown and, in the case of a bar code symbol, is comprised of a series of vertical bars spaced apart of one another along a longitudinal direction. A laser beam spot is focused on the symbol. When the scanning mirror is, as explained below, reciprocally and repetitively oscillated transversely to sweep the laser beam lengthwise across all the bars of the symbol, a linear scan is generated. The linear scan can be located anywhere along the height of the bars provided that all the bars are swept. The length of the linear scan is longer than the length of the longest symbol expected to be read and, in a preferred case, the linear scan is on the order of 3 inches at the reference plane.

The scanning mirror 19b is mounted on a scanning means, preferably a high-speed scanner motor 24 of the type shown and described in U.S. Pat. No. 4,387,397, the entire contents of said patent being incorporated herein by reference and made part of the instant application. For the purposes of this application, it is believed to be sufficient to point out that the scanner motor 24 has an output shaft 104 on which a support bracket 19 is fixedly mounted. The scanning mirror is fixedly mounted on the bracket. The motor is driven to reciprocally and repetitively oscillate the shaft in alternate circumferential directions over arc lengths of any desired size, typically less than 360°, and at a rate of speed on the order of a plurality of oscillations per second. In a preferred embodiment, the scanning mirror and the shaft jointly are oscillated so that the scanning mirror repetitively sweeps the laser diode beam impinging thereon through an angular distance or arc length at the reference plane of about 32° and at a rate of about 20 scans or 40 oscillations per second.

Referring again to FIG. 2, the returning portion of the scattered component of the reflected laser light has a variable light intensity, due to the different light-reflective properties of the various parts that comprise the symbol 100, over the symbol during the scan. The returning portion of the reflected laser light is collected by a generally concave, spherical collecting mirror 19a, and is a broad conical stream of light in a conical collecting volume centered on path 21c. The collecting mirror 19a reflects the collected conical light into the head along path 21b through a laser-light-transmissive element 106 to a sensor means, e.g. a photosensor 17. The photosensor 17, preferably a photodiode, detects the variable intensity of the collected laser light over a field of view which extends along, and preferably beyond, the linear scan, and generates an electrical analog signal indicative of the detected variable light intensity.

The photosensor "sees" a collection zone on the symbol. The aforementioned angular adjustment means ensures that the emitted laser beam impinges on the symbol at the collection zone when the laser spot impinges on the symbol.

The collecting mirror 19a is also mounted on the support bracket 19 and, when the scanning mirror is actuated by the trigger, the collecting mirror is reciprocally and repetitively oscillated transversely, sweeping the field of view of the photodiode lengthwise across the symbol in a linear scan.

The scanning mirror and the collecting mirror are, in a preferred embodiment, of one-piece construction, but the scanning mirror can also be a discrete, small, planar mirror attached by glue, or molded in place, at the correct position and angle on a discrete, front surfaced, silvered concave mirror. The concave collecting mirror serves to collect the returning portion of the laser light and to focus the same on the photodiode.

Also mounted in the head are various electrical subcircuits mounted on board 16. For example, signal processing means on board 16 are operative for processing the analog electrical signal generated by the sensor, and for generating a digitized video signal. Data descriptive of the symbol can be derived from the video signal. Suitable signal processing means for this purpose was described in U.S. Pat. No. 4,251,798. Component 39 on board 16 constitutes drive circuitry for the scanner motor, and suitable motor drive circuitry for this purpose was described in U.S. Pat. No. 4,387,297. Component 40 on board 16 is a voltage converter for converting the incoming voltage to one suitable for energizing the laser diode 33. The entire contents of U.S. Pat. Nos. 4,251,798 and 4,387,297 are incorporated herein by reference and made part of the instant application.

The digitized video signal is conducted, in one embodiment, along cable 15 to decode/control means 101 (see FIG. 4) operative for decoding the digitized video signal to a digitized decoded signal from which the desired data descriptive of the symbol is obtained, in accordance with an algorithm contained in a software control program. The decode/control means includes a PROM for holding the control program, a RAM for temporary data storage, and a control microprocessor for controlling the PROM and RAM. The decode/control means determines when a successful decoding of the symbol has been obtained, and also terminates the reading of the symbol upon the determination of the successful decoding thereof. The initiation of the reading is caused by depression of the trigger. The decode/control means also includes control circuitry for controlling the actuation of the actuatable components in the head, as initiated by the trigger, as well as for communicating with the user that the reading has been automatically terminated as, for example, by sending control signals to indicator lamps 36, 37 to illuminate the same.

The decoded signal is conducted to a remote, host computer 103 which serves essentially as a large data base, stores the decoded signal and, in some cases, provides information related to the decoded signal. For example, the host computer can provide retail price information corresponding to the objects identified by their decoded symbols.

In another embodiment, the decode/control means and a local data storage means are mounted on another printed circuit board 27 in the handle portion, and store multiple decoded signals which have been read. The stored decoded signals thereupon can be unloaded to a remote host computer. By providing the local data storage means, the use of the cable during the reading of the symbols can be eliminated—a feature which is very desirable in making the head as freely manipulatable as possible. A beeper 28 is also operationally mounted on board 27 so that the user can hear through a port 29 in the handle when a symbol has been successfully read.

Minimizing the dead zone, in which specular reflection may cause a symbol not to be successfully read, is achieved in several ways. First, the vertical height (non-scan direction) of the collecting mirror 19a is decreased and made as small as practicable. By minimizing this mirror height, the chances are less for collecting specular reflected light. At the same time, the horizontal width (scan direction) of the collecting mirror 19a is increased proportionately to the decrease in the height thereof so that the total collection area presented by the collecting mirror remains approximately the same. In a preferred case, the collecting mirror measures 9 mm by 25 mm, while the scanning mirror measures 6 mm by 6 mm. The collecting mirror can thus be characterized as being "short and wide" compared to the collecting mirror of U.S. Pat. No. 4,760,248 which, by contrast, is "tall and narrow".

Second, the further back the collecting mirror 19a is from the symbol, again, the chances are less for specular reflected light to be collected. Thus, collecting mirror 19a is situated adjacent the rear wall 11b of the head, and well back of the front wall 11a.

Figure 2:
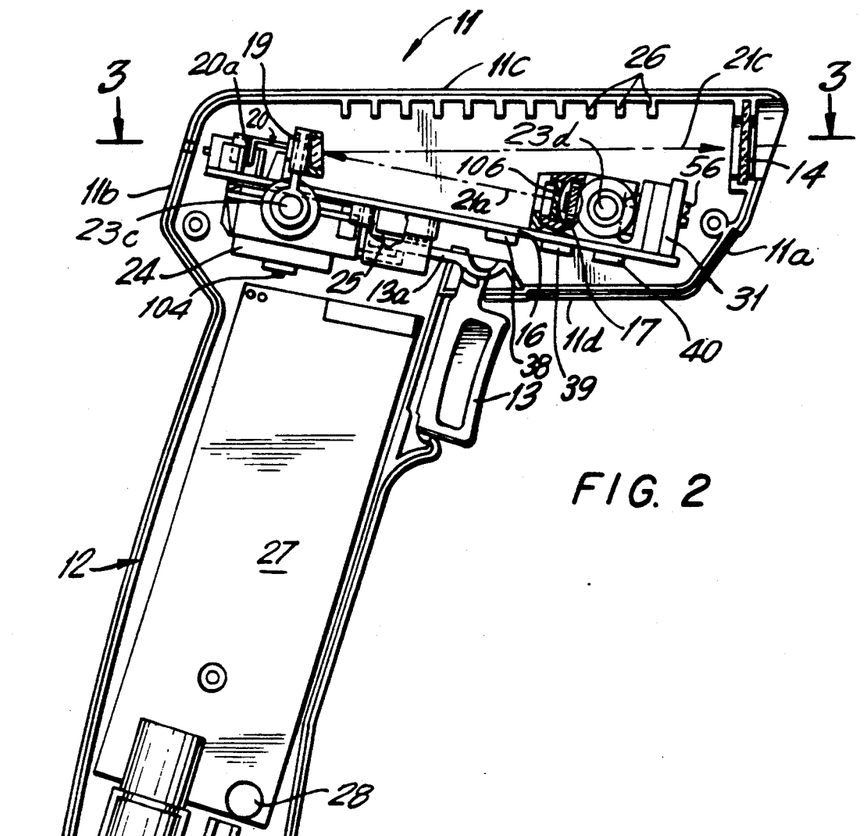
FIG. 2 is a vertical sectional view taken on line 2—2 of FIG. 1.
Figure 3:
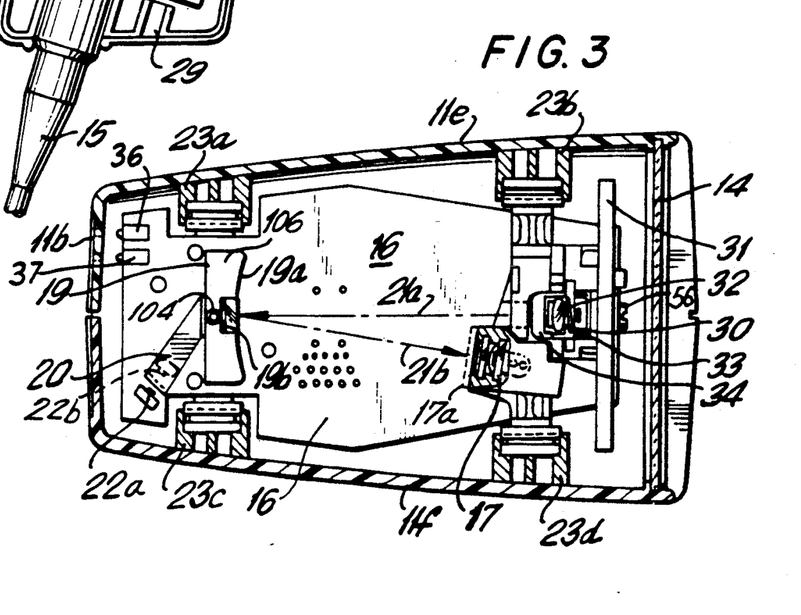
FIG. 3 is a plan sectional view taken on line 3—3 of FIG. 2.

Third, the optic means and scanning means inside the head are so positioned that the optical path 21c is inclined at a slight acute angle on the order of 3° relative to the horizontal. Thus, as shown in FIG. 2, when the user holds the head so that the upper planar wall 11c lies in a horizontal plane, the outgoing laser beam is directed at an upward slope of about 3° relative to the plane of the upper wall 11c. Hence, even when the head is held in the FIG. 2 position, the emitted laser beam will not be incident on the symbol at an angle of incidence of 90°.

Fourth, the inclined front wall 11a, which forms an acute angle relative to the bottom wall 11d, motivates the user to hold the barrel 11 at other than a right angle relative to the reference plane, and particularly so when the inclined front wall 11a *l is placed in contact with a symbol.*

Figures 6, 7:
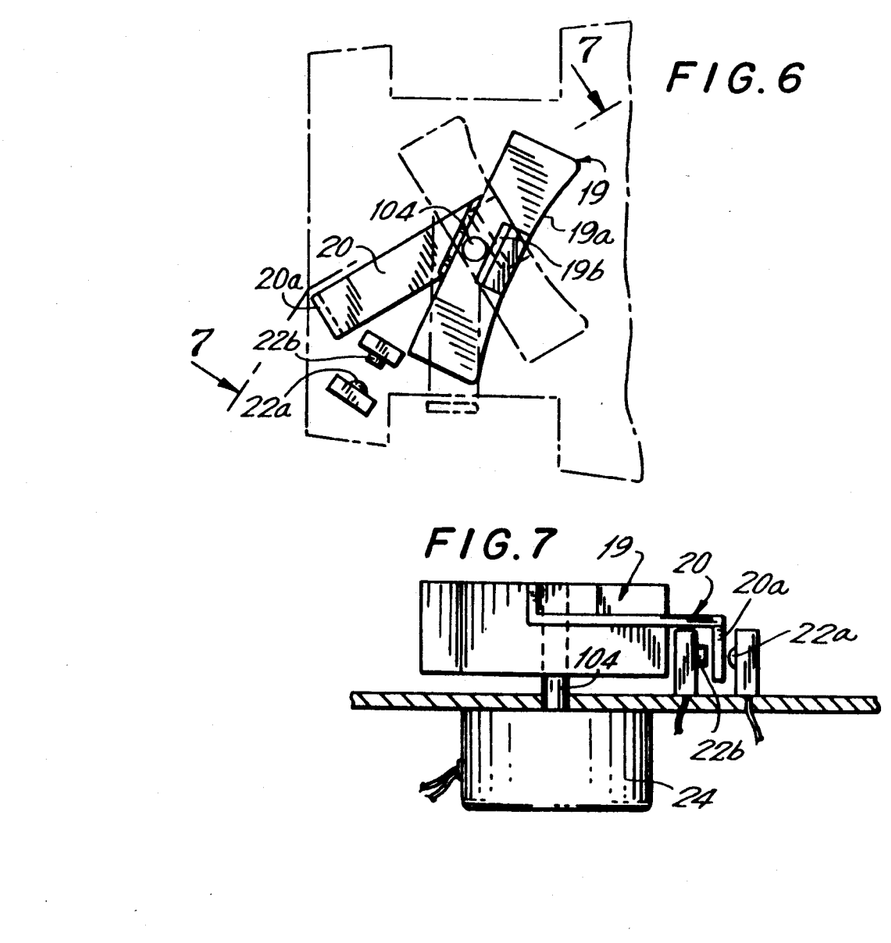
FIG. 6 is a top plan view of part of the optical assembly of FIG. 3.
FIG. 7 is a side view of the optical assembly of FIG. 6.

Power minimization by deactuating at least one of the components, particularly the laser diode, during a part of each scan is advantageously achieved by detecting when either the emitted laser beam and/or the field of view of the detector is outside the scan field in which the symbol is located. As best shown in FIGS. 2 and 7, an L-shaped arm 20 is fixed on, and extends rearwardly of, the bracket 19 for joint oscillating movement about the axis of shaft 104. The arm 20 terminates in a shutter 20a which is moved into and out of a light path between a light emitting diode 22a and a light receiver 22b.

As shown in FIG. 6, when the shutter is in a blocking position in which it interrupts the light emitted by the diode 22a, the receiver 22b senses the absence of light and, in turn, the laser diode 33 is turned on. When the shutter is in a non-blocking position in which it is remote from the light path, the receiver 22b receives the light emitted by diode 22a and, in turn, the laser diode 33 is turned off. In a preferred embodiment, the laser diode 33 is turned off by deactivating the voltage regulator 39 which supplies a regulated voltage to the diode 33.

Hence, the laser diode 33 is turned on when the laser beam and/or the field of view is scanning on the symbol, and is turned off when the laser beam and/or the field of view is scanning past the symbol at each end thereof. If the scan field or length of the symbol is on the order of 2¼" at the reference plane, and if the scan is about 3" at the reference plane, then the length of each overscan end region at either end of the symbol is about ⅜" and, as detailed above, there is no reason to have the laser diode on in each overscan region.

The laser scanning head of FIG. 2 is of the retro-reflective type wherein the outgoing incident laser beam, as well as the field of view of the sensor means, are scanned. It will be readily understood that other variants also are within the spirit of this invention. For example, the outgoing incident laser beam can be directed to, and swept across, the symbol through one window on the head, while the field of view is not scanned and the returning laser light is collected through another window on the head. Also, the outgoing incident beam can be directed to, but not swept across, the symbol, while the field of view is scanned.

Figure 9:
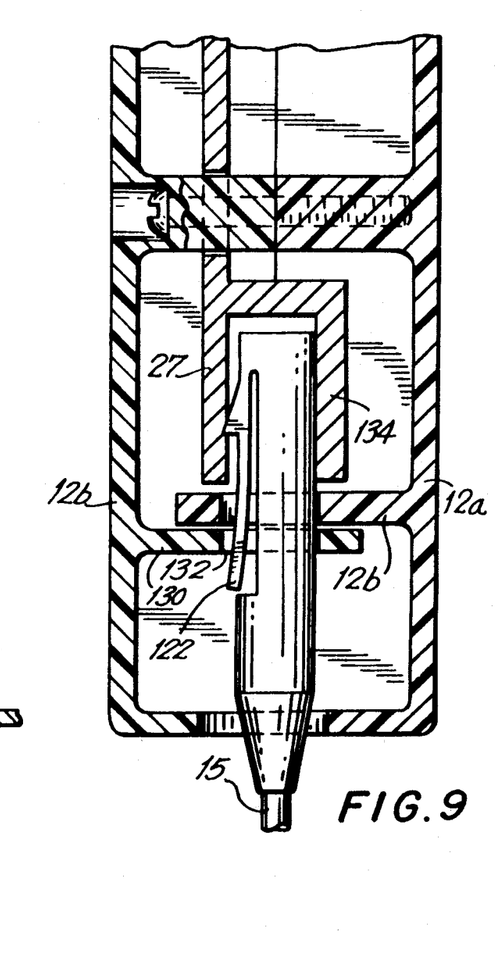
FIG. 9 is an enlarged sectional view taken on line 9—9 of FIG. 2.

Turning now to FIG. 9, cable 15 terminates in a connector pin 120 having a resilient metallic catch 122 formed with a barb 124. Housing part 12a has a web 126 formed with a clearance hole 128; and housing part 12b has a web 130 formed with a clearance hole 132 aligned with hole 128 when the parts are assembled. The pin 120 is inserted through the aligned holes 128, 132 and is electro-mechanically connected to a mating connector socket 134. During insertion, the barb 124 is pushed aside to clear the holes and, once cleared, the barb 124 lockingly engages a conductor on the circuit board 27.

Once fully inserted, the pin 120 affirmatively prevents the housing parts from being disassembled unless the pin 120 is first removed. Removal of the pin is achieved by first turning the pin 120 about its axis and then withdrawing the pin from the aligned holes.

The head herein need not be hand-held, but can be incorporated in a desk-top, stand-alone workstation in which the symbol is passed underneath an overhead window or port through which the outgoing beam is directed. Although the workstation itself is stationary during scanning, the symbol is movable relative to the workstation and must be registered with the outgoing beam and, for this purpose, the enhanced visibility laser beam described herein is advantageous. Also, the head may further include deactivation apparatus for changing the state of a surveillance device associated with a tag or label on which the symbol is provided, such as described in U.S. Ser. No. 236,249, assigned to the assignee of the instant application.

It will be understood that each of the elements described above, or two or more together, also may find a useful application in other types of constructions differing from the types described above.

While the invention has been illustrated and described as embodied in a laser diode scanner with minimized power consumption, minimized dead zone and increased safety, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a laser scanning system for reading indicia having portions of different light reflectivity, said system being of the type including
   (A) first light source means including an actuatable laser light source operative, when actuated, for generating an incident laser beam;
   (B) optic means for optically forming and directing the incident laser beam along an optical path toward indicia located within a scan field in the optical path, laser light thereby reflecting off the indicia, at least a returning portion of said laser light reflected off the indicia traveling away from the indicia back toward the system;
   (C) scanning means for scanning the indicia in a scan across the indicia, said returning portion of the laser light having a variable intensity over the scan;
   (D) first sensor means for detecting the variable intensity of the returning portion of the laser light over a field of view, and for generating an electrical analog signal indicative of the detected variable light intensity;
   (E) said scanning means being operative for scanning at least one of said incident laser beam and said field of view;
   (F) signal processing means for processing the analog electrical signal, and for generating a processed signal indicative of the indicia; and
   (G) means for actuating the actuatable source, the scanning means, the first sensor means and the signal processing means to initiate a reading of indicia each in its respective turn,
   the improvement which comprises:
   means for deactuating at least one of the actuatable source, the scanning means, the first sensor means and the signal processing means during each scan when at least one of said incident laser beam and said field of view is outside a selected portion of said scan field in said optical path;
   said means for deactuating including switching means mechanically coupled to said scanning means and responsive to the position in said scan field of said at least one of said incident light beam and said field of view, and said means for deactuating being separate from said first sensor means and from said analog signal;
   wherein said scanning means includes a rotating shaft and a mirror mounted on said rotating shaft, and said switching means includes a shutter coupled to said rotating shaft;
   a second light source and a second light sensor having a light passage between them, so that said second light source transmits light through said light passage toward said second light sensor;
   said second light sensor functioning to send a control signal to said actuating means responsive to blocking of light transmission through said light passage from said second light source, thereby controlling the deactuation of at least one of the actuatable source, the scanning means, the first sensor means and the signal processing means; and
   said shutter rotatable into and out of said light passage so that light transmitted by said second light source through said light passage and detected by said second light sensor is blocked when said shutter is rotated into said light passage and said light is not blocked when said shutter is rotated out of said light passage.

2. The improved system as recited in claim 1, wherein the laser light source is a laser diode, and wherein the deactuating means is operative for deactuating the laser diode at least once during each scan.

3. The improved system as recited in claim 2, wherein the light source means includes a laser power supply for supplying electrical current to the laser diode, and wherein the deactuating means interrupts the supply of current to the laser diode.

4. The improved system as recited in claim 3, wherein the laser diode has a rated operating lifetime and emits the incident laser beam with concomitant generation of heat; and wherein the laser power supply includes a heat sink for conducting the heat away from the diode, and a rechargeable battery having a limited working lifetime; and wherein the deactuating means increases each lifetime and decreases the amount of heat generated in system operation.

5. The improved system as recited in claim 1 wherein the scanning means includes an actuatable scanning motor operative, when actuated, to rotate said shaft a plurality of times per second to repetitively and cyclically scan each indicium located within the scan field; and said shutter provides a light-interrupting means operatively mounted on the drive shaft for joint movement therewith into and out of the light passage between an on condition in which said at least one of said incident laser beam and said field of view is within the scan field between said end limits thereof, and an off condition in which said at least one of said incident laser beam and said field of view is outside the scan field past said end limits thereof.

6. A system according to claim 1 wherein said switching means includes said shutter mounted on an arm extending from said shaft.

7. In a laser scanning system for reading indicia having portions of different light reflectivity, said system being of the type including
  (A) light source means including an actuatable laser light source operative, when actuated, for generating an incident laser beam;
  (B) optical means for optically forming and directing the incident laser beam along an optical path toward indicia located within a scan field in the optical path, laser light thereby reflecting off the indicia, at least a returning portion of said laser light reflected off the indicia traveling away from the indicia back toward the system;
  (C) scanning means for scanning the indicia in a scan across the indicia, said returning portion of the laser light having a variable intensity over the scan;
  (D) sensor means for detecting the variable intensity of the returning portion of the laser light over a field of view, and for generating an electrical analog signal indicative of the detected variable light intensity;
  (E) said scanning means being operative for scanning at least one of said incident laser beam and said field of view; said scanning means including an actuatable reciprocally oscillatable scanning mirror operative, when actuated, to oscillate a drive shaft a plurality of times per second to repetitively and cyclically scan each indicium located within said scan field;
  (F) signal processing means for processing the analog electrical signal, and for generating a processed signal indicative of the indicia; and
  (G) means for actuating the actuatable source, the scanning means, the sensor means and the signal processing means to initiate a reading of indicia each in its respective turn, the improvement which comprises:
means for deactuating at least one of the actuatable source, the scanning means, the sensor means and the signal processing means during each scan when said at least one of said incident laser beam and said field of view is outside a selected portion of said scan field in said optical path;
wherein said deactuating means includes means for sensing opposite end limits of the selected portion of the scan field, and means for generating a deactivation electrical signal for each sensed end limit;
said means for sensing including means for emitting an auxiliary light beam along a light pathway, and a light-interrupting means operatively mounted on the drive shaft for joint movement therewith into and out of the light pathway between one condition in which said at least one of said incident laser beam and said field of view is within the selected portion of the scan field between said end limits thereof, and another condition in which said at least one of said incident laser beam and said field of view is outside the selected portion of the scan field past said end limits thereof;
wherein the emitting means includes a light emitting diode and a light receiver at opposite ends of the light pathway; and wherein the light-interrupting means includes a shutter driven by the drive shaft into and out of the light pathway; and wherein the receiver senses the blocking of received light emitted by the light emitting diode when the shutter blocks the light pathway in said one condition and received light emitted by the light emitting diode when the shutter is remote from the light pathway in said another condition.

8. The improved system as recited in claim 7, wherein the light source means include a laser diode and a regulated voltage supply for supplying a regulated voltage to the laser diode, and including means responsive to the receiver for interrupting the supply of regulated voltage to the laser diode in the off condition.

9. A laser scanning system for reading bar codes, comprising:
  (a) a first laser light source for generating an incident laser beam when activated, and optics for directing the incident laser beam along a path toward a bar code, laser light thereby reflecting off the bar code;
  (b) a first sensor detecting the intensity of laser light reflected off a field of view of the bar code and generating an electrical signal responsive thereto;
  (c) a scanner for scanning at least one of said incident laser beam and said field of view in a scan line across said bar code;
  (d) means for deactuating operative during each scan line when said at least one of said incident laser beam and said field of view is outside a selected portion of said scan line, said means for deactuating functioning in response to a control signal to deactuate at least one of the actuatable source, the scanner, the first sensor means and the signal processing means; said means for deactuating including means mechanically coupled to said scanner and responsive to the position in said scan line of said at least one of said incident light beam and said field of view, and said means for deactuating being separate from said first sensor and from said electrical signal;
wherein said scanner includes a rotating shaft and a mirror mounted on said rotating shaft, and said means mechanically coupled to said scanner includes a shutter coupled to said rotating shaft;
a second light source and a second light sensor having a light passage between them, so that said second light source transmits light through said light passage toward said second light sensor;
said second light sensor sending said control signal to said deactuating means, said control signal being responsive to light blocked from said second light source to said second light sensor through said light passage, thereby deactuating at least one of the actuatable source, the scanner, the first sensor means and the signal processing means; and said shutter rotatable into and out of said light passage so that light transmitted by said second light source through said light passage and detected by said second light sensor is blocked when said shutter is rotated into said light passage and said light is not blocked when said shutter is rotated out of said light passage.

10. A system according to claim 9 wherein said shutter rotates about an axis which is the central axis of said rotating shaft.

11. A laser scanner for reading a bar code system, comprising:
   a) a laser source generating a light beam for directing toward said bar code symbol;
   b) a light detector responsive to light reflected from a field of view of said bar code symbol;
   c) scanning means for scanning at least one of said light beam and said field of view in a scan line across said bar code symbol, the scanning means including an optical element mounted on a moving shaft;
   d) deactivating means for deactivating at least one of said laser source, said light detector and said scanning means, the deactivating means including:
      a light source and a sensor with a light passage between said light source and said sensor;
      a shutter mechanically coupled to said shaft for movement therewith, the shutter moving into and out of said light passage as said at least one of said light beam and said field of view moves along said scan line;
      the deactivating means being responsive to an output of said sensor to control an on and off condition of said at least one of said laser source, said light detector and said scanning means.

12. A scanner according to claim 11 wherein said optical element is a mirror oscillating with said shaft and driven by an electric motor.

13. A scanning according to claim 11 wherein said shutter blocks light in said passage when said light beam is in a selected part of said scan line.

14. A scanner according to claim 13 wherein said deactivating means limits the length of said scan line to a selected length.

15. A scanner according to claim 11 wherein said optical element includes a scan mirror for scanning said light beam along said scan line.

16. A scanner according to claim 15 wherein said optical element includes a curved mirror moving with said scan mirror and directing said reflected light toward said light detector.

17. A scanner according to claim 11 wherein said deactivating means deactivates said laser source.

18. A scanner according to claim 11 including signal processing means receiving an electrical signal from said light detector and generating bar code information therefrom.

* * * * *

UNITED STATES PATENT AND TRADEMARK OFFICE
CERTIFICATE OF CORRECTION

PATENT NO. : 5,157,248
DATED : October 20, 1992
INVENTOR(S) : Edward Barkan

It is certified that error appears in the above-indentified patent and that said Letters Patent is hereby corrected as shown below:

Column 13, line 5, delete "for".

Column 14, line 42, change "actuating" to --deactuating--.

Column 17, line 13, change "system" to --symbol--.

Column 18, line 11, change "scanning" to --scanner--.

Signed and Sealed this

First Day of February, 1994

Attest:

BRUCE LEHMAN

*Attesting Officer*  *Commissioner of Patents and Trademarks*